United States Patent Office 2,782,682
Patented Feb. 26, 1957

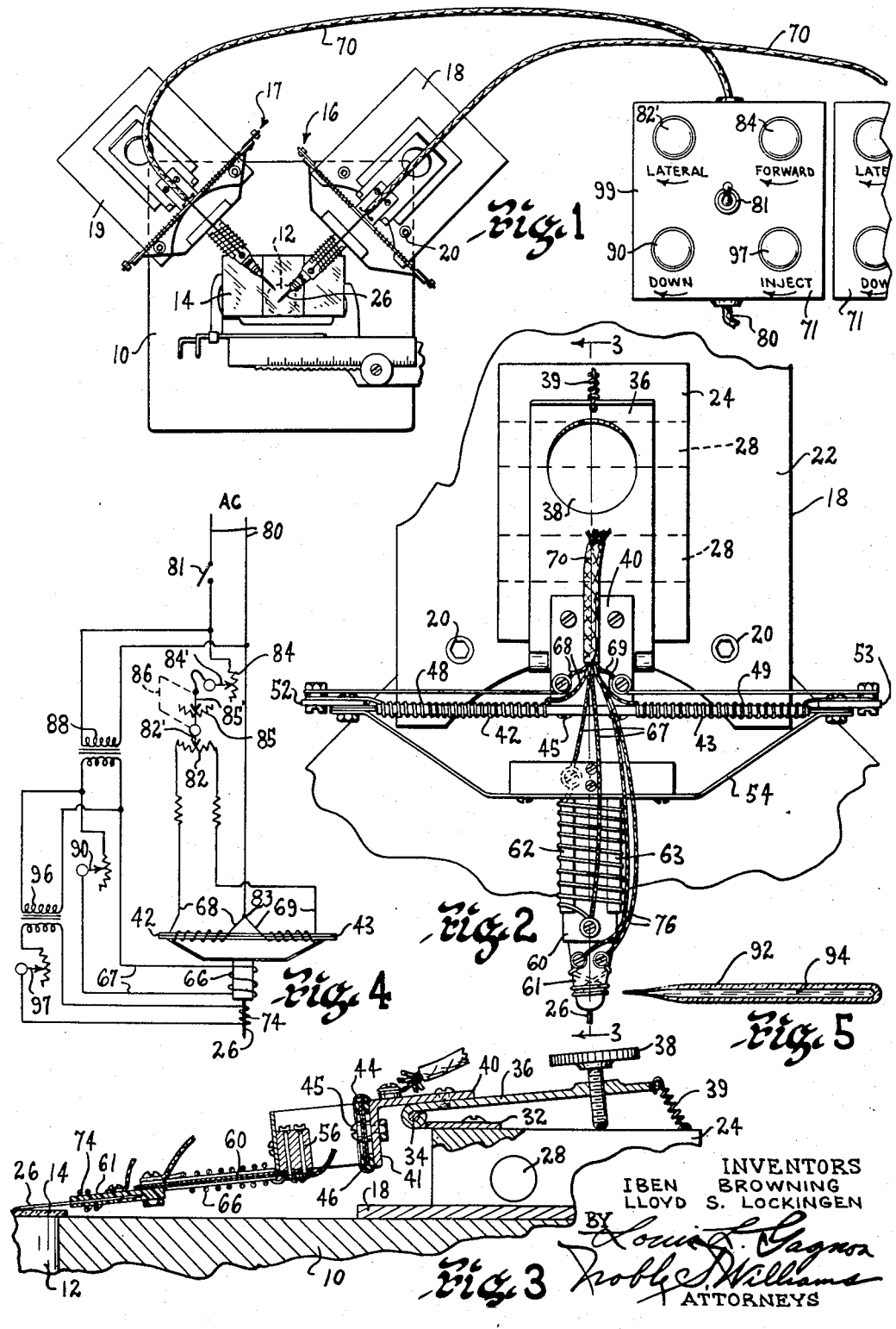

2,782,682

MICROMANIPULATORS

Iben Browning, Buffalo, N. Y., and Lloyd S. Lockingen, Houston, Tex.

Application May 29, 1953, Serial No. 358,458

13 Claims. (Cl. 88—40)

This invention relates to micromanipulators and the like, arranged for use with microscopes and similar optical instruments for accurately positioning, moving and controlling micromanipulator tools relative to microscopic bodies within the object field of the microscope or like instrument during use thereof.

Micromanipulators are not new. However, the provision of a micromanipulator which is of a simple and inexpensive construction and still efficient in its operation while being free from backlash, lost motion and objectionable vibration at medium and high magnification of the instrument has been heretofore a difficult problem. Even instruments of exceedingly expensive construction have failed to provide these desirable features. On the other hand a good micromanipulator, if not too expensive, would be a very desirable device to have available for use particularly as an experimental and research tool.

It is accordingly, an object of the present invention to provide a micromanipulator or the like which is of an inexpensive construction but which is nevertheless, capable of accurate positioning and control for very small increments of movement of the micromanipulator tool or needle being controlled thereby and with the tool being relatively free from vibration and the like even at medium and relatively high optical magnifications.

It is an additional object of the invention to provide a micromanipulator of the character described which is capable of independent longitudinal movement, lateral movement and vertical movement of varying amounts to cover the entire object field of the optical instrument while being observed therethrough, as for example a conventional microscope.

It is an additional object of the present invention to provide convenient and readily controllable means whereby one or a plurality of micromanipulators may be readily controlled so as to separately move the tools thereof small amounts in any single direction desired or any combinations of directions simultaneously to thereby provide universal movement for said tools.

It is a further object of the present invention to provide a micromanipulator tool having injection means for use with such a micromanipulator whereby small amounts of liquids may be controlled, injected, extracted or otherwise applied to the object or specimen being considered within the field of the microscope.

Other objects and advantages of the invention will become apparent with the detailed description of the invention which follows when taken in conjunction with the accompanying drawings in which:

Fig. 1 is a plan view of a conventional microscope stage having applied thereto a pair of micromanipulators and control means therefor embodying the present invention;

Fig. 2 is an enlarged plan view of one of the micromanipulators of Fig. 1;

Fig. 3 is a longitudinal sectional view taken substantially upon section line 3—3 of Fig. 2;

Fig. 4 is a wiring diagram for use in the apparatus of Fig. 1; and

Fig. 5 is an appreciably enlarged cross sectional view of a needle which may be advantageously used in either of said manipulators.

Referring to the drawings in detail and particularly Fig. 1, it will be seen that a microscope stage indicated by the numeral 10 has centrally provided therein an aperture 12 which is normally disposed substantially concentric with reference to the optical axis of an optical system of an optical instrument (not shown) embodying a condenser and objective for supplying light to objects upon the stage and for forming an image of such objects in the image field of said objective. Normally, microscopic specimens to be observed under a microscope or the like will be supported upon a heamacytometer or microscope slide, such as indicated at 14, and in order that the operator of the instrument may move, control or otherwise condition the specimens under observation through the instrument, there is provided one or more micromanipulators 16, 17.

In Fig. 1, there is shown a pair of supporting plates 18 and 19 of appreciable size and each of which may be clamped, bolted or otherwise secured in relatively fixed relation to the stage 10, such as by means of a pair of screws 20. A preferred embodiment of the invention may have the plates 18 and 19 in the form of pieces of smooth sheet steel or equivalent ferrous material extending outwardly from the stage so as to provide an upper surface 22 upon which a main supporting block 24 of the micromanipulator 16 or 17 may be positioned. Carried upon a forward part of each micromanipulator is a micromanipulator tool 26, the position and movement of which is to be accurately controlled either in microscopically small increments of movement or larger increments, as desired, as will be more fully described hereinafter, with the outer free end portion of the tool 26 being readily controllable by the operator for universal movement. When a pair of such micromanipulators 16 and 17 (or even a greater number) are employed, it is possible to control and treat in many ways objects being observed through the microscope or optical instrument.

The purpose for forming the plate 18 of ferrous material is so that the main supporting block 24 may be provided with a pair of permanent magnets 28 embedded therein for hold-down purposes, thereby providing a readily adjustable manner for positioning and holding the micromanipulators in any location desired in a substantially horizontal plane parallel to the surface of the stage. Of course, in place of forming plates 18, 19 of steel and providing permanent magnets, the plate 18 might be formed of plastic or the like and the supporting block 24 formed of heavy material or weighted so that it will stay in various positions of adjustment during normal use of the instrument. However, permanent magnets within the blocks have been found to give very satisfactory results.

Carried upon the block 24, as clearly shown in Figs. 2 and 3, is a plate 32 having a hinge 34 at its forward edge to which a second plate 36 is hingedly secured. The plate 36 in turn may be adjusted in angular relation to the plate 32 by means of an adjustment screw 38 threaded through plate 36. A hold-down spring 39 tensioned between the block 24 and plate 36 may be provided if desired. In this manner, coarse vertical adjustment may be provided the outer free end portion of the micromanipulator tool 26 to be controlled by the micromanipulator. Coarse adjustment of the tool 26 in any direction in a horizontal plane may be had by movement of the block 24 upon the surface 22.

A supporting bracket 40 preferably of dielectric insulating material is carried in fixed relation to the adjustable plate 36 and has a forward portion 41 thereof bent downwardly, and to this downwardly bent portion is secured at 45 a pair of laterally extending vertically disposed arms 42 and 43 formed of a bimetal material, such as a thin wide elongated piece of steel soldered to the face of a similarly shaped piece of brass. Each bimetal arm arrangement is provided with upper and lower channel shaped small strips 44 and 46 of electrically insulating heat resistant material such as asbestos or fiber glass, so that a coil of Nichrome heating wire 48 and a second coil 49 of proper size may be wrapped about said arms but without having contact with the metal of which the arms are formed. Instead of having the bracket 40 of dielectric material, it could, of course, be made of metallic material and arranged to support a block of insulating material such as Bakelite or Formica to which the laterally extending arms 42, 43 may be secured.

Insulating blocks 52 and 53 are provided at the outer free ends of arms 42 and 43 for securing the coils in their wound positions. Also secured to the outer ends of arms 42 and 43 is a forwardly extending bowed member 54 which is arranged to support adjacent a central portion thereof a second bracket or block 56 which is arranged to support a forwardly extending control arm comprising a longitudinally arranged horizontally disposed bimetal strip 60. While the bimetal arms 42, 43 are arranged to lie in substantially vertical planes so that any flexing which may occur therein due to changes of temperature thereof will cause the free ends of the arms to move forwardly or rearwardly, as the case may be, the strip 60, on the other hand, is arranged to lie in a substantially horizontally disposed plane and thus its forward free end will move vertically in response to temperature changes therein. The tool 26 carried thereby accordingly will be moved vertically.

In a manner similar to the construction of arms 42 and 43, the bimetal strip 60 is provided with thin elongated channel shaped insulating strips 62 and 63 adjacent its opposite edges so as to support a coil 66 of heating wire in spaced relation closely adjacent the bimetal strip 60. In like manner, the opposite ends of the wire 66 coiled about strip 60 are secured to insulating means. Thus pairs of insulated wires 67, 68 and 69 extending from the coils 66, 48 and 49 respectively, may be combined into a flexible cable 70 so as to extend to a manually controllable unit 71 which may be disposed adjacent the microscope at either side of the instrument for use by the operator thereof. A similar cable is shown extending from the second micromanipulator 17 to a second similar manual control unit.

Referring to Fig. 4, it will be seen that there is provided at 80 a pair of leads to be connected to a source of electrical energy, such as an ordinary 120 volt A. C. current. An on-off switch is indicated at 81. Current to be used to heat the coils about arms 42 and 43 is supplied through a manually variable potentiometer 82 having its opposite ends connected to the outer ends of coils 48 and 49 and its movable control 82' connected through means to be presently described to said source. A common point 83 between said coils 48, 49 is also connected to said source. Thus the parts are arranged so that when the control 82' is in a central position equal amounts of current will pass through the coils 48 and 49. The amount of current therethrough for causing forward movement of the tool 26, however, may be controlled by a manually controllable resistance or rheostat 84 in series with one side of the A. C. supply. Thus the amount of heat being supplied both coils 48 and 49 may be varied simultaneously by moving rheostat arm 84'. The amount of heat being supplied to one arm 42 or the other 43 when the control 82' is moved laterally from its central position may also be varied.

In the preferred construction shown in Fig. 4, however, a second resistance 85 having control 85' is provided in series with the manually controllable resistance 84 and has its center point connected to control 82'. This resistance 85 may be coupled by suitable mechanical means 86 with the control 82' for a purpose to be presently described. When the control 82' is in its central position and current is passing in equal amounts through the coils 48 and 49, an increase in current effected by a change in the position of the control 84 will cause equal amounts of heat to be applied to coils 48 and 49 and thus equal amounts of flexing of both arms 42 and 43 forwardly, with the result that the micromanipulator tool 26 will be moved forwardly a corresponding small amount. Increments of movement as small as ½ micron are possible. The amount of forward movement of course will depend upon how much heat is being supplied to said arms. A lessening of the amount of heat being supplied will cause the tool to move rearwardly.

If the control 82' is then moved to one side or the other, a greater amount of current will be allowed to pass through one coil 48, or 49, than through the other, with the result that one arm will be heated more while the other will be heated a lesser amount. The heated arm will flex more while the amount of flexing of the opposite one will be lessened. The result will be that the forward end of the tool 26 will be caused to move laterally in a predetermined direction. This movement of the free end of the tool 26, however, would be an arcuate movement.

In order that this lateral movement of the free end of the tool 26 to either side may be strictly a linear sidewise movement rather than arcuate, coupling means 86 is provided for causing controls 82' and 85' to move simultaneously in the same direction. (Or even suitably shaped cam means could be provided for the purpose.) Controlling resistance 85 at the same time that the control 82' is moved toward either side will cause a certain predetermined amount of resistance to be introduced into the circuit as the resistance of resistor 82 is lessened, that is as control 82' approaches one lateral limit of its movement or the other. A linear lateral movement of the free end of the tool 26 can thus be provided.

A transformer 88 is arranged to receive current from the source and provides through its secondary an increased amount of current at a lower voltage so that through a relatively small number of turns in the coil 66 wound upon the longitudinally extending strip 60 a proper amount of heat may be provided for vertical downward flexing thereof. To control the amount of current and thus the amount of heat being supplied bimetal strip 60 to cause this downward movement, there is provided a manually adjustable rheostat 90 in series with the secondary of transformer 88. Thus failure of current will not injure tool 26.

It has been found desirable at times and under certain conditions of use of one or any of such micromanipulators to employ instead of the tool 26 or other conventional thin needle or probe, a very small hollow needle 92 of special construction. The needle is preferably formed from glass tubing drawn out to an exceedingly small inside diameter of about 1½ microns at the tip and filled with distilled water as shown at 94 in Fig. 5. A tool support or elongated finger is shown at 61 in Figs. 2 and 3 secured to the free end of the forwardly extending control arm and this tool support 61 is arranged to receive in an opening or recess therein either the tool 26 or hollow needle 92 or other equivalent means. About the tool support 61, which is preferably formed of mica, is wound one or two turns of a heating wire 74 which is connected by similar flexible electrical leads 76 through cable 70 with the manual control unit 71. The purpose for such a specialized tool 92 is that by the proper control of heat being supplied by the turns of wire 74 wound about tool support 61 to the hollow needle when positioned therein, the volume of liquid within the needle may be varied slightly with the result that the needle and liquid therein may be used for injecting into a microorganism, or the like, or for extracting material from such a microorganism and thereafter injecting this material into another, or used for the treatment of such a microorganism with suitable solutions as desired. A volume as small as one cubic micron of liquid can be controlled in this manner without difficulty. A second stepdown transformer 96 is connected, in somewhat similar manner, to the secondary of transformer 88 and has its secondary in turn connected through rheostat 97 to coil 74 and is thus arranged to heat and control the action of the hollow injection needle 92.

The controls are preferably arranged in an enclosed box-like container 99 of small size so that it may be conveniently positioned to one side or the other, or two used side by side at a side of the microscope or like optical instrument. While a pair of micromanipulators has been shown in Fig. 1 and arranged to extend inwardly at approximately 90° relative to each other from the remote corners of the microscope stage, it will be appreciated that such manipulators might be disposed at other convenient locations as long as suitable room exists therebetween allowing proper functioning thereof.

Coarse adjustment in all directions in a substantially horizontal plane may be obtained by movement of the block 22 relative to the supporting plate 18, while coarse adjustment in the vertical direction may be readily accomplished by the adjustment screw 38. When the working or free end of the micromanipulator tool or needle is positioned within the field of the microscope, fine adjustment or movement of the needle or tool forwardly, or rearwardly, or laterally, or vertically may be accomplished by the manual controls just described. When working at exceedingly high magnifications, for example at 500×, 1,000× or even as high as approximately 2,000× vibration is not too serious a problem. It has been found, in the present invention that the use of the micromanipulators or micromanipulators directly upon the stage of the instrument reduces such vibration to a minimum. Also, by having the manual controls entirely free from the optical instrument, through the medium of a flexible electrical cable or conductor, freedom from vibration has been increased.

Having described our invention, we claim:

1. A micromanipulator for use with a microscope or like optical instrument having an object supporting stage, said micromanipulator comprising a supporting block arranged to be supported in a fixed position relative to said stage during use thereof, means for accurately moving and positioning a micromanipulator tool relative to an object upon said stage and while within the object field of said optical instrument, said moving and positioning means being secured to said supporting block and having a pair of control arms extending laterally in opposite directions therefrom, each of said control arms comprising temperature responsive means arranged to flex in a substantially horizontal direction when subjected to changes in temperature, electrical heating means disposed adjacent each of said control arms, a supporting bar secured to the outer free ends of both of said control arms, a micromanipulator tool supporting means supported by said supporting bar and extending forwardly therefrom, and readily controllable means connected to each of said electrical heating means and arranged to be connected to a source of electrical energy for controlling the amounts of current being supplied thereto.

2. A micromanipulator for use with a microscope or like optical instrument having an object supporting stage, said micromanipulator comprising a supporting block arranged to be supported in a fixed position relative to said stage during use thereof, means for accurately moving and positioning a micromanipulator tool relative to an object upon said stage and while within the object field of said optical instrument, said moving and positioning means being secured to said supporting block and having a pair of control arms extending laterally in opposite directions therefrom, each of said control arms comprising temperature responsive means arranged to flex in a substantially horizontal direction when subjected to changes in temperature, electrical heating means disposed adjacent each of said control arms, a flexible supporting bar having its opposite ends fixedly secured to the outer free ends of both of said control arms, a micromanipulator tool supporting means supported by said flexible supporting bar and extending forwardly therefrom, and readily controllable means connected to each of said electrical heating means and arranged to be connected to a source of electrical energy for controlling the amounts of current being supplied thereto.

3. A micromanipulator for use with a microscope or like optical instrument having an object supporting stage, said micromanipulator comprising a supporting block arranged to be in a fixed position relative to said stage during use thereof, means for accurately moving and positioning a micromanipulator tool relative to an object upon said stage and while within the object field of said optical instrument, said moving and positioning means being secured to said supporting block and having a pair of control arms extending laterally in opposite directions therefrom, each of said control arms comprising temperature responsive means arranged to flex in a substantially horizontal direction when subjected to changes in temperature, electrical heating means disposed adjacent each of said control arms, a supporting bar secured to the outer free ends of both of said control arms, a forwardly extending control arm centrally carried by said supporting bar and comprising temperature responsive means arranged to flex in a vertical direction when subjected to temperature changes, electrical heating means disposed adjacent said forwardly extending control arm, a micromanipulator tool supporting means supported by said forwardly extending control arm and extending forwardly therefrom, and readily controllable means connected to each of said electrical heating means and arranged to be connected to a source of electrical energy for controlling the amounts of current being supplied thereto.

4. A micromanipulator for use with a microscope or like optical instrument having an object supporting stage, said micromanipulator comprising a supporting block arranged to be supported in a fixed position relative to said stage during use thereof, means for accurately moving and positioning a micromanipulator tool relative to an object upon said stage and while within the object field of said optical instrument, said moving and positioning means being secured to said supporting block and having a vertically tiltable plate positioned thereon, coarse adjustment means for changing the angle of tilt of said plate, a pair of control arms extending laterally in opposite directions from an element carried by a forward part of said plate, each of said control arms comprising temperature responsive means arranged to flex in a substantially horizontal direction when subjected to changes in temperature, electrical heating means disposed adjacent each of said control arms, a supporting bar secured to the outer free ends of both of said control arms, a micromanipulator tool supporting means supported by said supporting bar and extending forwardly therefrom, and readily controllable means connected to each of said electrical heating means and arranged to be connected to a source of electrical energy for controlling the amounts of current being supplied thereto.

5. A micromanipulator for use with a microscope or like optical instrument having an object supporting stage, said micromanipulator comprising a supporting block arranged to be supported in a fixed position relative to said stage during use thereof, means for accurately moving and positioning a micromanipulator tool relative to an object upon said stage and while within the object field of said optical instrument, said moving and positioning means being secured to said supporting block and having a vertically tiltable plate positioned thereon, coarse adjustment means for changing the angle of tilt of said plate, a pair of control arms extending laterally in opposite directions from an element carried by a forward part of said plate, each of said control arms comprising temperature responsive means arranged to flex in a substantially horizontal direction when subjected to changes in temperature, electrical heating means disposed adjacent each of said control arms, a supporting bar secured to the outer free ends of both of said control arms, a forwardly extending control arm centrally carried by said supporting bar and comprising temperature responsive means arranged to flex in a vertical direction when subjected to temperature changes, electrical heating means disposed adjacent said forwardly extending control arm, a micromanipulator tool supporting means supported by said forwardly extending control arm and extending forwardly therefrom, and readily controllable means connected to each of said electrical heating means and arranged to be connected to a source of electrical energy for controlling the amounts of current being supplied thereto.

6. A micromanipulator for use with a microscope or like optical instrument having an object supporting stage, said micromanipulator comprising a plate of ferrous material adapted to be secured to said stage, a supporting block arranged to be supported thereby during use thereof and having magnetic means therein in a position so as to attract said plate when said block is disposed thereon, means for accurately moving and positioning a micromanipulator tool relative to an object upon said stage and while within the object field of said optical instrument, said moving and positioning means being secured to said supporting block and having a pair of control arms extending laterally in opposite directions therefrom, each of said control arms comprising temperature responsive means arranged to flex in a substantially horizontal direction when subjected to changes in temperature, electrical heating means disposed adjacent each of said control arms, a supporting bar secured to the outer free ends of both of said control arms, a micromanipulator tool supporting means supported by said supporting bar and extending forwardly therefrom, and readily controllable means connected to each of said electrical heating means and arranged to be connected to a source of electrical energy for controlling the amounts of current being supplied thereto.

7. A micromanipulator for use with a microscope or like optical instrument having an object supporting stage, said micromanipulator comprising a plate of ferrous material adapted to be secured to said stage, a supporting block arranged to be supported thereby during use thereof and having magnetic means therein in a position so as to attract said plate when said block is disposed thereon, means for accurately moving and positioning a micromanipulator tool relative to an object upon said stage and while within the object field of said optical instrument, said moving and positioning means being secured to said supporting block and having a vertically tiltable plate positioned thereon, coarse adjustment means for changing the angle of tilt of said plate, a pair of control arms extending laterally in opposite directions from an element carried by said plate, each of said control arms comprising temperature responsive means arranged to flex in a substantially horizontal direction when subjected to changes in temperature, electrical heating means disposed adjacent each of said control arms, a supporting bar secured to the outer free ends of both of said control arms, a micromanipulator tool supporting means supported by said supporting bar and extending forwardly therefrom, and readily controllable means connected to each of said electrical heating means and arranged to be connected to a source of electrical energy for controlling the amounts of current being supplied thereto.

8. A micromanipulator for use with a microscope or like optical instrument having an object supporting stage, said micromanipulator comprising a supporting block arranged to be supported in a fixed relation relative to said stage during use thereof, means for accurately moving and positioning a micromanipulator tool relative to an object upon said stage and while within the object field of said optical instrument, said moving and positioning means being secured to said supporting block and having a pair of control arms extending laterally in opposite directions therefrom, each of said control arms comprising temperature responsive means arranged to flex in a substantially horizontal direction when subjected to changes in temperature, electrical heating means disposed adjacent each of said control arms and having one end of each heating means connected together at a common point, a supporting bar secured to the outer free ends of both of said control arms, an arm supported centrally by said supporting bar and extending forwardly therefrom and having means on a free end portion of said forwardly extending arm for supporting a manipulator tool or the like, a potentiometer having its opposite ends connected to the other ends respectively of said electrical heating means for said pair of control arms, and having a movable contact movable in opposite directions for differently affecting said electrical heating means and thereby effecting sidewise movement of said tool supporting means in corresponding directions, and means for connecting said common point and said movable contact respectively to a source of electrical energy.

9. The combination set forth in claim 8 and wherein the means for connecting said common point and said movable contact to said source of electrical energy includes manual means for varying the amount of energy being supplied said electrical heating means for said pair of control arms to thereby control the fore and aft movement of said tool supporting means.

10. A micromanipulator for use with a microscope or like optical instrument having an object supporting stage, said micromanipulator comprising a supporting block arranged to be supported in a fixed relation relative to said stage during use thereof, means for accurately moving and positioning a micromanipulator tool relative to an object upon said stage and while within the object field of said optical instrument, said moving and positioning means being secured to said supporting block and having a pair of control arms extending laterally in opposite directions therefrom, each of said control arms comprising temperature responsive means arranged to flex in a substantially horizontal direction when subjected to changes in temperature, electrical heating means disposed adjacent each of said control arms and having one end of each heating means connected together at a common point, a supporting bar secured to the outer free ends of both of said control arms, a control arm supported centrally by said supporting bar and extending forwardly therefrom and having means on a free end portion thereof for supporting a manipulator tool or the like, a potentiometer having its opposite ends connected to the other ends respectively of said electrical heating means for said pair of control arms, and having a movable contact movable in opposite directions for differently affecting said electrical heating means thereby effecting sidewise movement of said tool supporting means in corresponding directions, means for connecting said common point and said movable contact to a source of electrical energy, additional electrical heating means disposed adjacent said forwardly extending control arm, readily controllable means connected to said electrical heating means for said forwardly extending control arm and movable in opposite directions for effecting vertical movement of said tool supporting means in opposite directions, and means for connecting said last mentioned heating means and said controllable means to said source of electrical energy.

11. The combination set forth in claim 10 and wherein the means for connecting said common point and said movable contact to said source of electrical energy includes manual means for varying the amount of energy being supplied said electrical heating means for said pair of control arms to thereby control the fore and aft movement of said tool supporting means.

12. A micromanipulator for use with a microscope or like optical instrument having an object supporting stage, said micromanipulator comprising a supporting block arranged to be supported in a fixed relation relative to said stage during use thereof, means for accurately moving and positioning a micromanipulator tool relative to an object upon said stage and while within the object field of said optical instrument, said moving and positioning means being secured to said supporting block and having a vertically tiltable plate positioned thereon, coarse adjustment means for changing the angle of tilt of said plate, a pair of control arms extending laterally in opposite directions from an element carried by said plate, each of said control arms comprising temperature responsive means arranged to flex in a substantially horizontal direction when subjected to changes in temperature, electrical heating means disposed adjacent each of said control arms and having one end of each heating means connected together at a common point, a supporting bar secured to the outer free ends of both of said control arms, a control arm supported centrally by said supporting bar and extending forwardly therefrom and having means on a free end portion thereof for supporting a manipulator tool or the like, a potentiometer having its opposite ends connected to the other ends respectively of said electrical heating means for said pair of control arms, and having a movable contact movable in opposite directions for differently affecting said electrical heating means thereby effecting sidewise movement of said tool supporting means in corresponding directions, means for connecting said common point and said movable contact to a source of electrical energy, additional electrical heating means disposed adjacent said forwardly extending control arm, readily controllable means connected to said electrical heating means for said forwardly extending control arm and movable in opposite directions for effecting relatively fine vertical movement of said tool supporting means in opposite directions, and means for connecting said last mentioned heating means and said controllable means to said source of electrical energy.

13. A micromanipulator for use with a microscope or like optical instrument having an object supporting stage, said micromanipulator comprising a supporting block arranged to be supported in a fixed relation relative to said stage during use thereof, means for accurately moving and positioning a micromanipulator tool relative to an object upon said stage and while within the object field of said optical instrument, said moving and positioning means being secured to said supporting block and having a pair of control arms extending laterally in opposite directions therefrom, each of said control arms comprising temperature responsive means arranged to flex in a substantially horizontal direction when subjected to changes in temperature, electrical heating means disposed adjacent each of said control arms and having one end of each heating means connected together at a common point, a supporting bar secured to the outer free ends of both of said control arms, an arm supported centrally by said supporting bar and extending forwardly therefrom and having means on a free end portion of said forwardly extending arm for supporting a manipulator tool or the like, a potentiometer having its opposite ends connected to the other ends respectively of said electrical heating means for said pair of control arms, and having a movable contact movable in opposite directions for differently affecting said electrical heating means and thereby effecting sidewise movement of said tool supporting means in corresponding directions, and means for connecting said common point and said movable contact respectively to a source of electrical energy, said last mentioned means including an adjustable electrical component coupled with said movable contact for movement therewith for altering the amount of current being supplied to said potentiometer and thereby effecting substantially rectilinear travel during sidewise movement of said tool supporting means.

References Cited in the file of this patent
UNITED STATES PATENTS

| | | |
|---|---|---|
| 1,859,823 | Fitz | May 24, 1932 |
| 1,931,344 | Fitz | Oct. 17, 1933 |
| 1,987,733 | Fonbrune | Jan. 15, 1935 |
| 2,642,064 | Lawshe | June 16, 1953 |